UNITED STATES PATENT OFFICE.

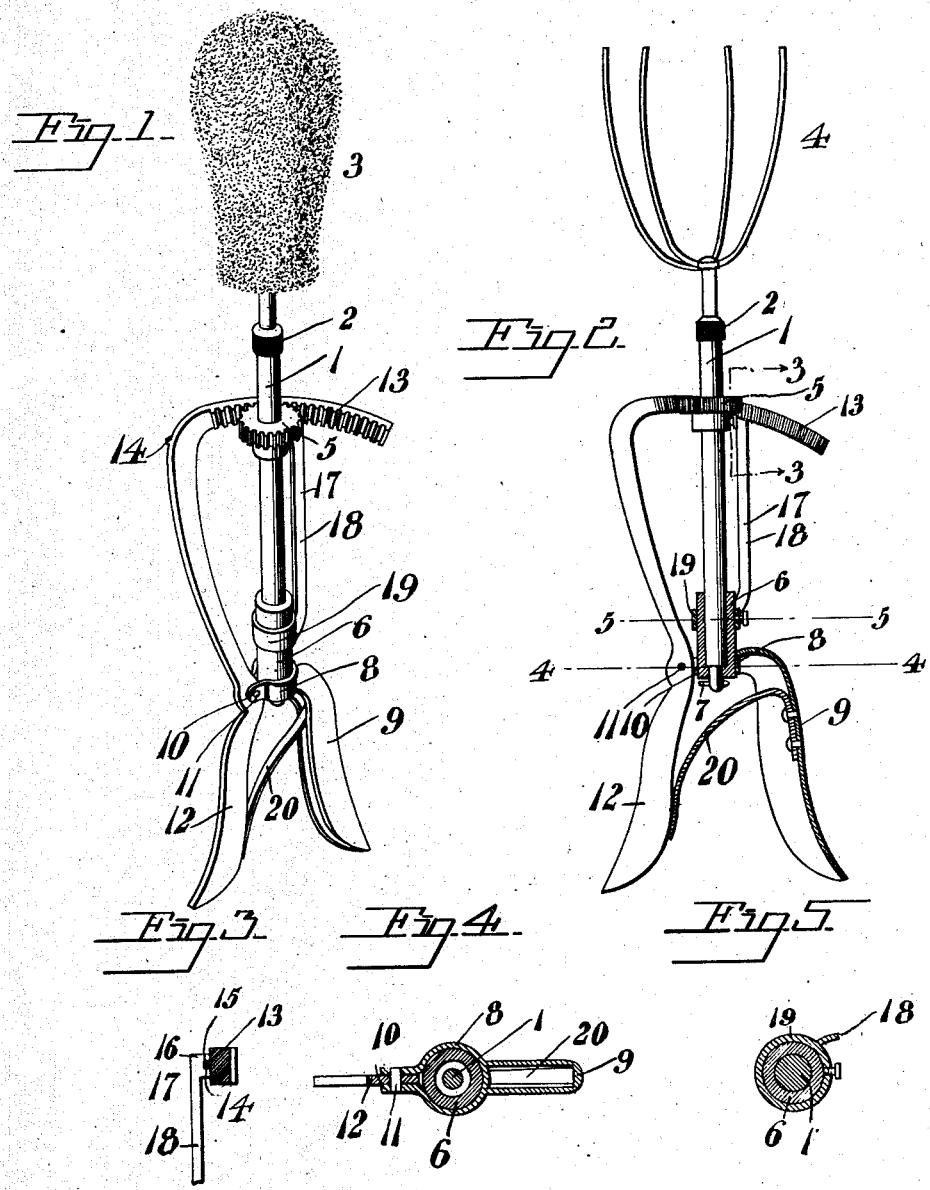

CHARLES H. STAIB, OF BETHEL, CONNECTICUT.

GEARING DEVICE.

1,174,906. Specification of Letters Patent. Patented Mar. 7, 1916.

Application filed December 13, 1915. Serial No. 66,602.

*To all whom it may concern:*

Be it known that I, CHARLES H. STAIB, a citizen of the United States, residing at Bethel, in the county of Fairfield and State of Connecticut, have invented new and useful Improvements in Gearing Devices, of which the following is a specification.

The present invention relates to a hand operated gearing device for mixing, cleaning etc., and the object of the invention is to provide a device of this kind primarily adapted for use in kitchens, whereby the interior of bottles may be easily and quickly cleaned and whereby stirring and mixing of liquids or paste, etc., may be readily accomplished.

In carrying out my invention it is my purpose to provide an article of this character which will accommodate mixing and cleaning apparatus of various kinds which will embody the desirable features of simplicity, cheapness and thorough efficiency.

It is also my purpose to construct a shaft or spindle in one of its ends provided with a chuck, at its opposite end mounted in a tubular socket, to arrange upon the spindle a toothed wheel, to detachably secure to the socket a handle member and a lever, to provide the lever with a rack bar which is adapted to co-act with the toothed wheel upon the spindle, and to further provide a guide or contact member for the rack to force the teeth of the same into positive engagement with the teeth of the wheel, and to arrange a spring between the handle and lever so that the lever and rack bar are normally moved to one position with relation to the spindle and handle.

With the above and other objects in view, the improvement resides in the construction, combination and arrangement of parts set forth in the following specification and falling within the scope of the appended claims.

In the drawing: Figure 1 is a perspective view of a device constructed in accordance with the present invention, a rotary brush being attached thereto, Fig. 2 is a central longitudinal section through the same showing a beater member arranged thereon, Fig. 3 is a sectional view approximately on the line 3—3 of Fig. 2, Fig. 4 is a similar sectional view approximately on the line 4—4 of Fig. 2, and Fig. 5 is a similar sectional view approximately on the line 5—5 of Fig. 2.

Referring now to the drawing in detail, the numeral 1 designates a rod or spindle which is round in cross section and which has one of its ends provided with a chuck 2, whereby the shanks of a cleaning member, such as a rotary brush, indicated by the numeral 3, or the shank of a beater member, indicated by the numeral 4, may be attached to the spindle. Carried by the spindle is a toothed wheel 5, the same being preferably removably and adjustably secured to the spindle, and the spindle receives a bar and a tubular socket 6, the end of the spindle being provided with a reduced portion which projects through an opening in the partially closed end of the socket and this projecting portion of the spindle is provided with a securing element, such as a cotter pin, or the like, and which is indicated by the numeral 7.

The numeral 8 designates a collar which is removably and adjustably secured upon the socket 6, the said collar being preferably formed with an angular extension providing a handle 9. The collar, diametrically opposite the handle is formed with a projecting lug 10 to which is centrally pivoted, as at 11, a lever 12. The lever is extended in opposite angular directions from the pivot 11, and one end of the said lever is provided with an angularly arranged rack bar 13, the same being concentric of the pivot 11 and positioned to engage with the teeth of the wheel 5. The rack bar 13 has its rear or smooth face preferably provided with a centrally arranged longitudinally extending rib 14 which is received within a channel 15 provided in the head member 16 of a guide 17. This guide includes an arm 18 which has one of its ends secured to or formed with a sleeve 19 that is adjustably secured upon the socket 6. By such an arrangement, it will be noted that the collar of the guide member may be moved angularly of the socket so that the head of the guide may be forced with the desired friction against the smooth side of the rack bar 13, to retain the teeth of the same into contacting engagement with the teeth of the wheel 5. It will be further noted that by arranging the lever 12 upon the adjustable collar 8, the said lever may be adjusted longitudinally to positively position the teeth of the rack bar into engagement with the teeth of the wheel 5.

The numeral 20 designates a flat spring which has one of its ends secured to the inner edge of the lever 12 and its opposite end contacting with the inner edge of the handle 9, so as to swing the lever away from the handle and consequently move the rack bar to one position with relation to the spindle 1 and the tooth wheel 5.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. In a device for the purpose set forth, a spindle, a chuck for the spindle, a toothed wheel upon the spindle, a bearing socket for the spindle, a handle connected with the socket, a lever centrally and pivotally connected to the socket, a rack bar formed upon one end of the lever and adapted to coöperate with the toothed wheel, a guide member contacting with the smooth face of the rack bar to force the teeth of the same into engagement with the teeth of the wheel, a handle upon the socket, and a spring between the handle and the lever.

2. In a device for the purpose set forth, a rotatable spindle, a toothed wheel adjustably arranged upon the spindle, a bearing socket for one end of the spindle, means for retaining the spindle in the socket, a handle having a collar removably and adjustably connected with the tubular socket, a substantially U-shaped lever centrally pivoted to the collar and arranged diametrically opposite the handle, a spring between the lever and handle, said lever having one of its ends formed with a laterally extending rack bar which is adapted to co-act with the toothed wheel of the spindle, the rear or smooth face of the rack bar being provided with a longitudinally extending rib and a guide member having a channeled head receiving the rib, said guide member including an arm provided with a collar which is rotatably and adjustably secured upon the tubular socket.

In testimony whereof I affix my signature in presence of two witnesses.

CHARLES H. STAIB.

Witnesses:
 JOHN CARROLL,
 HOWARD H. WOODMAN.